United States Patent
Rademacher et al.

(10) Patent No.: US 8,356,571 B2
(45) Date of Patent: Jan. 22, 2013

(54) APPLICATOR AND APPLICATION METHOD FOR APPLYING A SEALANT TO A FLANGED SEAM

(75) Inventors: Lothar Rademacher, Bietigheim-Bissingen (DE); Almir Smajilovic, Stuttgart (DE)

(73) Assignee: Dürr Systems GmbH (DE)

( * ) Notice: Subject to any disclaimer, the term of this patent is extended or adjusted under 35 U.S.C. 154(b) by 673 days.

(21) Appl. No.: 12/513,124

(22) PCT Filed: Jul. 25, 2008

(86) PCT No.: PCT/EP2008/006144

§ 371 (c)(1),
(2), (4) Date: Apr. 30, 2009

(87) PCT Pub. No.: WO2009/021609

PCT Pub. Date: Feb. 19, 2009

(65) Prior Publication Data

US 2010/0075058 A1    Mar. 25, 2010

(30) Foreign Application Priority Data

Aug. 10, 2007  (DE) .......................... 10 2007 037 865

(51) Int. Cl.
| | |
|---|---|
| *B05B 3/00* | (2006.01) |
| *B05B 9/06* | (2006.01) |
| *B05B 7/00* | (2006.01) |
| *B05B 13/02* | (2006.01) |
| *B05C 5/00* | (2006.01) |
| *B05C 3/02* | (2006.01) |
| *B05C 15/00* | (2006.01) |
| *B05C 5/02* | (2006.01) |
| *C23C 16/00* | (2006.01) |
| *B05D 1/02* | (2006.01) |

(52) U.S. Cl. ........ 118/323; 118/300; 118/305; 118/321; 118/410; 118/712; 427/424; 156/356

(58) Field of Classification Search ........................ None
See application file for complete search history.

(56) References Cited

U.S. PATENT DOCUMENTS 4,698,005 A * 10/1987 Kikuchi et al. ............... 118/410
(Continued)

FOREIGN PATENT DOCUMENTS

| DE | 3912920 A1 | 12/1989 |
|---|---|---|
| DE | 19936716 A1 | 2/2001 |
| DE | 102004039684 | 5/2005 |
| EP | 1238713 A1 | 9/2002 |
| EP | 1375008 A2 | 1/2004 |

(Continued)

OTHER PUBLICATIONS

International Search Report, PCT/EP2008/006144, Dated Oct. 30, 2008.

*Primary Examiner* — Laura Edwards
*Assistant Examiner* — Binu Thomas
(74) *Attorney, Agent, or Firm* — Bejin, VanOphem & Bieneman, PLC

(57) ABSTRACT

An applicator is disclosed for applying a coating agent, such as a sealant, to a component, such as a flanged seam of a motor vehicle body component. The applicator includes a nozzle for delivering the coating agent on to the component and a carrier. The carrier may be guided by a multiple-axis robot in operation, with a joint located kinematically between the carrier and the nozzle, thereby permitting the nozzle to move to avoid contact with a component being coated.

28 Claims, 10 Drawing Sheets

U.S. PATENT DOCUMENTS

| | | | |
|---|---|---|---|
| 4,809,885 A * | 3/1989 | Hayashi et al. | 118/410 |
| 4,838,986 A * | 6/1989 | Rhoades et al. | 156/574 |
| 5,578,128 A * | 11/1996 | Schneider | 118/323 |
| 6,589,344 B2 * | 7/2003 | Cho | 118/323 |
| 7,387,222 B2 * | 6/2008 | Thompson et al. | 222/527 |
| 2005/0056213 A1 | 3/2005 | Iimori et al. | |

FOREIGN PATENT DOCUMENTS

| | | | |
|---|---|---|---|
| JP | 05-115825 | * | 5/1993 |
| JP | 05115825 | | 5/1993 |
| JP | 2005122027 | | 5/2005 |
| WO | 9922401 | | 5/1999 |

* cited by examiner

APPLICATOR AND APPLICATION METHOD FOR APPLYING A SEALANT TO A FLANGED SEAM

CROSS-REFERENCE TO RELATED APPLICATIONS

This Application is a National Phase application claiming the benefit of International Application NO. PCT EP2008/006144 filed on Jul. 25, 2008, which claims priority to German Patent Application No. DE 10 2007 037 865 filed on Aug. 10, 2007, the complete disclosures of which are hereby incorporated by references in their entireties.

BACKGROUND

The present disclosure concerns an applicator for applying a coating agent, particularly a sealant, to a component, such as to a flanged seam of a motor vehicle body component, and a corresponding application method.

The present disclosure also describes a coating robot with an exemplary applicator and the novel use of an exemplary applicator in a coating device.

Applicators are generally known from DE 10 2004 039 684 B4 and JP 2005 122 027 A which describe a translational avoiding movement by an application nozzle. However, these applicators are generally unsuitable for applying a sealant to a flanged seam of a motor vehicle body component.

FIG. 10 (prior art) shows a specimen flanged seam 1, as is frequently found in motor vehicle body components such as bonnets or doors. A sheet metal panel 2 is cemented to an angled panel edge 4 of an inside panel 5 by a layer of adhesive 3, where a panel edge 6 of the sheet metal panel 2 is curved in a U-shape around the panel edge 4 of the inside panel 5 and lies against the reverse side of the panel edge 4 of the inside panel 5. Moisture may penetrate the gap between the panel edge 6 of the sheet metal panel 2 and the panel edge 4 of the inside panel 5, causing corrosion. Thus, a sealant 7 may be applied to the seam between the panel edge 6 of the sheet metal panel 2 and the panel edge 4 of the inside panel 5. However, the sealant 7 must extend along the entire length of the seam in order to effectively prevent the penetration of moisture and the associated corrosion.

In practice, when motor vehicle body doors are being coated, the sealant 7 is applied manually by workers, who first open the relevant door and then apply the sealant 7 to the seam manually.

There are also working methods in which the workers coat the flanged seam 1 with the door closed. In this case, the manually-guided tool uses the external surface of the component as a guide.

However, the manual application of the sealant 7 to the flanged seam 1 is a labor-intensive and costly process.

Further, attempts to apply sealant 7 to the flanged seam with a coating robot have hitherto entailed considerable problems in practice, for various reasons.

Firstly, the sealant 7 could only be applied to the flanged seam 1 in the case of doors and bonnets if the doors and bonnets were first opened, which necessitates an extra step of opening the doors or bonnets.

Secondly, the application of the sealant 7 to the flanged seam 1 requires extremely high positional accuracy of the coating robot, which is only possible with a sensor-assisted positional control system that constantly readjusts the position of the robot in accordance with any positional deviations detected. In an automatic application of the sealant 7 to the flanged seam 1, the cost for such control systems in order to achieve the necessary positional accuracy vitiates any cost savings realized from the decrease in labour costs.

Accordingly, there is a need in the art for a more cost-effective method of applying a sealant to a flanged seam.

BRIEF DESCRIPTION OF THE DRAWINGS

While the claims are not limited to the illustrated examples, an appreciation of various aspects is best gained through a discussion of various examples thereof. Referring now to the drawings, illustrative examples are shown in detail. Although the drawings represent the examples described herein, the drawings are not necessarily to scale and certain features may be exaggerated to better illustrate and explain an innovative aspect of an example. Further, the examples described herein are not intended to be exhaustive or otherwise limiting or restricting to the precise form and configuration shown in the drawings and disclosed in the following detailed description. Exemplary illustrations are described in detail by referring to the drawings as follows.

DETAILED DESCRIPTION

Figure 1:
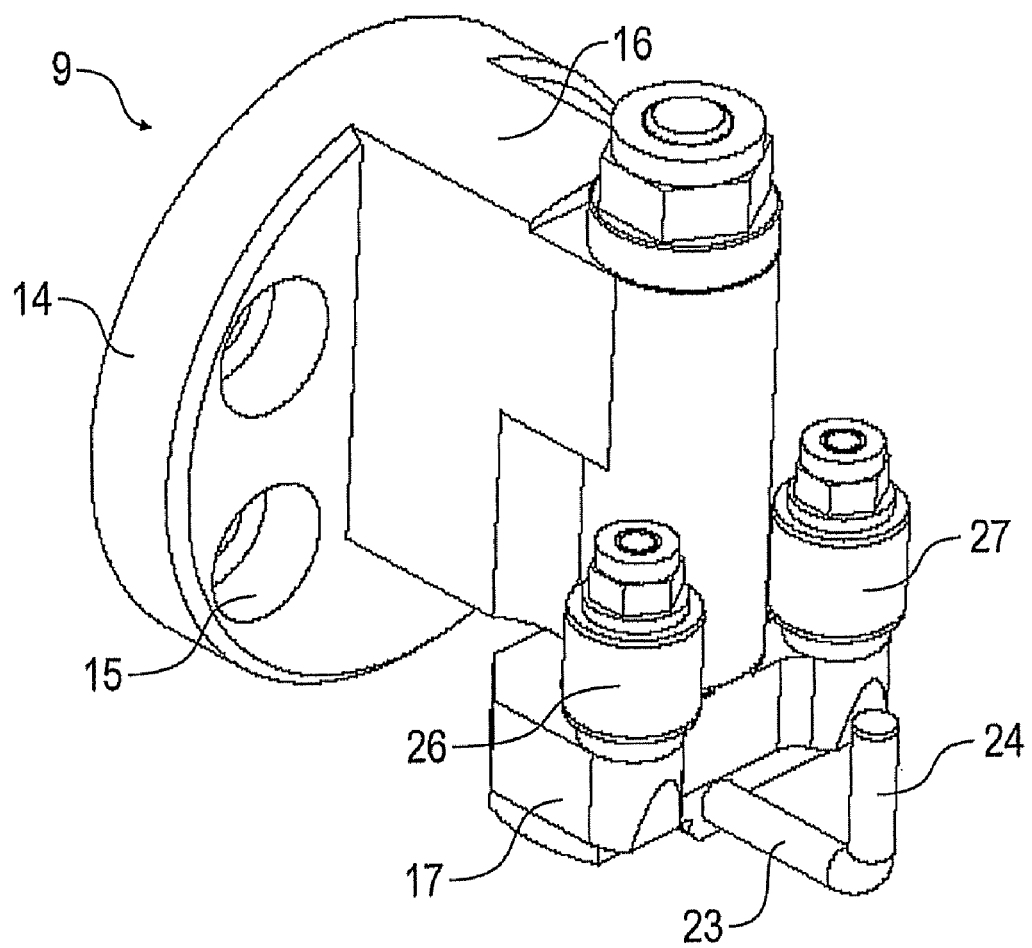
FIG. 1: is a three-quarter view of an application tool of an exemplary applicator.

Reference in the specification to "an exemplary illustration", and "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

The exemplary embodiments described herein provide for applying a sealant to a flanged seam by a robot. For this purpose, an applicator is provided which has a carrier (e.g. a mounting flange), which is guided by a multiple-axis robot when in operation. The applicator also has a nozzle to apply the sealant to the flanged seam. The exemplary applicator includes an additional elastic joint, located kinematically between the carrier and the nozzle and permitting an avoiding movement of the nozzle in relation to the carrier, thereby significantly reducing the necessary positional accuracy of the robot. The avoiding movement by the nozzle reduces the requirements for positional accuracy of the robot used, as the joint and thus the nozzle can yield if the nozzle contacts the component to be coated because of positional inaccuracy by the robot. As is generally clear from the examples described below and shown in the Figures, an avoiding movement may generally include a passive movement of the nozzle in response to an external stimulus, e.g., contact with a component that is being coated.

The joint may be a swivel joint which facilitates rotation of the nozzle in relation to the carrier. However, there is also a possibility of the joint being a drag link, thereby facilitating a swivel movement of the nozzle in relation to the carrier. However, the present disclosure is not restricted to the two above-mentioned types of joints, and may also be implemented with any other joint types that are convenient.

The concept of a robot as described herein may generally include a multiple-axis robot with, for example, 5, 6 or 7 axes and/or a hand axis with, for example, 2, 3 or 4 axes. The concept of a robot used herein is, however, not restricted to such multiple-axis robots, but also may include other types of manipulators which make it possible to move the applicator along the flanged seam to be sealed, such as, for example, robots with parallel kinematics or a combination of various robot kinematics, such as, e.g., the combination of parallel and serial kinematics.

Moreover, the disclosure also provides a possibility for the applicator to be spatially fixed, whilst the component to be coated (e.g. a vehicle door) is moved in relation to the applicator.

Neither is the disclosure restricted to the application of sealant to a flanged seam of a motor vehicle body component described above. Thus, the various exemplary illustrations described herein are also suitable for applying other coating agents.

It should also be mentioned that the present disclosure is not restricted to motor vehicle body components in respect of the component to be coated, such as doors and bonnets of motor vehicle bodies. Rather, the exemplary illustrations provided herein may also be employed for coating other components from different areas of technology.

The concept of a carrier described herein may include a mounting flange for mounting an applicator on a robot hand axis or robot arm. However, the carrier may also include other components of the applicator.

An exemplary applicator also may advantageously include at least one spring element which returns the elastic joint and thus the nozzle to a predetermined or specified neutral position in relation to the carrier in the absence of an external force acting on the nozzle to displace the nozzle from the predetermined neutral position.

In one exemplary illustration, an applicator includes at least one rotating contact pressure roller which rolls along a surface of a component to be coated. The application side, on which application of the coating agent takes place, is located on the opposite side of the component with respect to the surface along which the pressure roller is moved. The exemplary applicator and its contact pressure rollers thus rolls on one side of the component to be coated, while the applicator coats the component with the coating agent on the other side of the component.

In another exemplary illustration, the applicator has at least one sliding surface instead of the contact pressure rollers. The sliding surface slides along the surface of the component to be coated. In this case, the applicator may slide upon the side of the component that is being coated.

In the aforementioned exemplary illustrations with a contact pressure roller, the contact pressure roller may include a soft material (e.g. plastic), to avoid scratching the component to be coated. Alternatively, it is also possible for the contact pressure roller to be coated with a relatively soft material, to prevent the surface of the component to be coated from being scratched.

In another exemplary illustration, a contact pressure roller and a joint have rotary axes, which are substantially parallel to one another. Such an arrangement of axes of the contact pressure roller and the joint is advantageous when the contact pressure rollers roll on one side of the component to be coated while a nozzle applies a coating agent to the opposite side of the component to be coated. The contact pressure roller and the nozzle may be rigidly connected with each other and can be swivelled in relation to the carrier (e.g. the mounting flange) by the joint.

A rigid connection between the contact pressure rollers and the nozzle can be provided by a pressure rocker. The pressure rocker may be attached by the joint to the carrier so that it will swivel about a specified axis of rotation, and bears the nozzle and at least one contact pressure roller on either side of the axis of rotation, such that the contact pressure rollers form a common rolling surface. The contact pressure rollers may then roll on one side of the component to be coated, thereby simultaneously ensuring a defined spatial orientation of the nozzle with respect to the rollers on the opposite side of the component to be coated.

Should the applicator have a sliding surface which slides along the surface of the component to be coated in operation, the sliding surface may have an angled ramp at the front and/or rear in the direction of sliding, to compensate for varying surface contours of the component to be coated. The angled ramps may be at an angle to the actual sliding surface, for example, in the range of 5°-45°. In one known example, an angle of approximately 30° has been employed. However, the present disclosure is not restricted to the aforementioned range in terms of the angle of the ramps to the sliding surface, and thus any other angle may be employed that is convenient.

An exemplary applicator may also have a nozzle pipe with a proximal pipe section and a distal pipe section for transferring the coating agent. The distal pipe section may be disposed at an angle to the proximal pipe section, thereby allowing the component to be coated to be gripped from behind, while the nozzle and/or the nozzle aperture are located in the distal pipe section and directed inwards in order to coat the component from behind. The angle between the distal pipe section and the proximal pipe section of the nozzle pipe may thus enable the applicator to be guided along the front of the component to be coated while the back of the component is coated. The nozzle pipe may be generally L- or U-shaped, but other bent or curved nozzle pipe shapes are also possible as well.

An exemplary nozzle may apply a coating agent to the surface of the component to be coated generally at a right angle. However, the nozzle of the exemplary applicator may have a discharge direction which is at a specific angle relative to the surface of the component to be coated in operation. In one known example, the angle is in the range between 10° and 90°, which advantageously allows the coating agent to be applied to the surface of the component obliquely. However, any other angles may be employed that are convenient. A nozzle may then be aligned against the direction of advance of the applicator. In other words, the coating agent is delivered to the rear from the applicator, in relation to the direction of feed of the applicator. However, the nozzle may be aligned in the direction of feed or at right angles to the direction of feed of the applicator where convenient.

The nozzle aperture may be of varying sizes, and may be determined in accordance with a particular geometry of a desired sealant bead. Any application method that is convenient may be employed, such as, but not limited to, a round spray or extrusion.

In some exemplary illustrations the nozzle pipe is generally interchangeable, so that the applicator can be adapted to different component geometries simply by changing the nozzle pipe.

Moreover, the nozzle and/or the nozzle pipe may include a shock-absorbing coating, e.g. of rubber or plastic.

In one example, the applicator has a hollow arm and a nozzle head containing the nozzle attached to the arm so that the head may swivel. In this case, a coating agent hose or pipe extends in the hollow arm, to carry the coating agent to be applied to the nozzle head and the nozzle located therein.

A spring element may also be provided, to return the entire nozzle head and the nozzle to a neutral position without applying external forces. The spring element may be located, merely as examples, in the hollow arm or externally on the side of the hollow arm.

It is also advantageous if a coating agent feed system is provided inside the carrier of the inventive applicator, so that external hoses or pipes are generally not necessary.

In relation to the elastic joint, it should be mentioned that it may advantageously permit at least one rotary avoiding movement and/or at least one translational avoiding movement of the nozzle in relation to the carrier. In one known example, the joint allows two or three translational avoiding movements and one rotary avoiding movement.

A first translational avoiding movement of the nozzle may be aligned at substantially right angles to the surface of the component to be coated, the rolling surface of the contact pressure rollers or the distal section of the nozzle pipe.

In contrast, a second translational avoiding movement may be aligned substantially parallel to the surface of the component to be coated, the rolling surface of the contact pressure rollers or the distal section of the nozzle pipe.

Finally, a rotary avoiding movement of the nozzle may be provided in a rotation plane which is aligned substantially at right angles to the surface of the component to be coated, the rolling surface of the contact pressure rollers or the distal section of the nozzle pipe.

The various exemplary applicators described herein may be provided on a complete coating robot, and employed in a corresponding coating method, as generally described herein.

An exemplary method may provide for applying a sealant to a flanged seam of a vehicle closure panel, e.g., a door or bonnet, while the closure panel is closed to the vehicle. This advantageously eliminates any process steps dedicated to opening/closing the closure panel. Furthermore, a sealant may be fed from an external side of the door or bonnet and then applied to a flanged seam on an inside of the door or bonnet. For this purpose, a nozzle may be guided through a gap in the bodywork from the outside to the inside of the door or bonnet, whereupon the nozzle can access and thereby seal the flanged seam on the inside of the door or bonnet.

Alternatively, a nozzle may be guided around an edge of the door or bonnet from the outside to the inside of the door or bonnet, to seal the flanged seam located there.

It must also be mentioned that an exemplary applicator may be moved with a certain positional tolerance, whereby the joint of the exemplary applicator facilitates a certain compensation for tolerance. The tolerance compensation of the joint may be greater than the positional tolerance of the applicator, so that the joint can generally compensate for every possible positioning error of the robot.

Finally, exemplary methods are provided herein for using not only the applicator described above and a corresponding application method, but also using the applicator to apply a sealant to a flanged seam of a motor vehicle body component.

Figure 10:
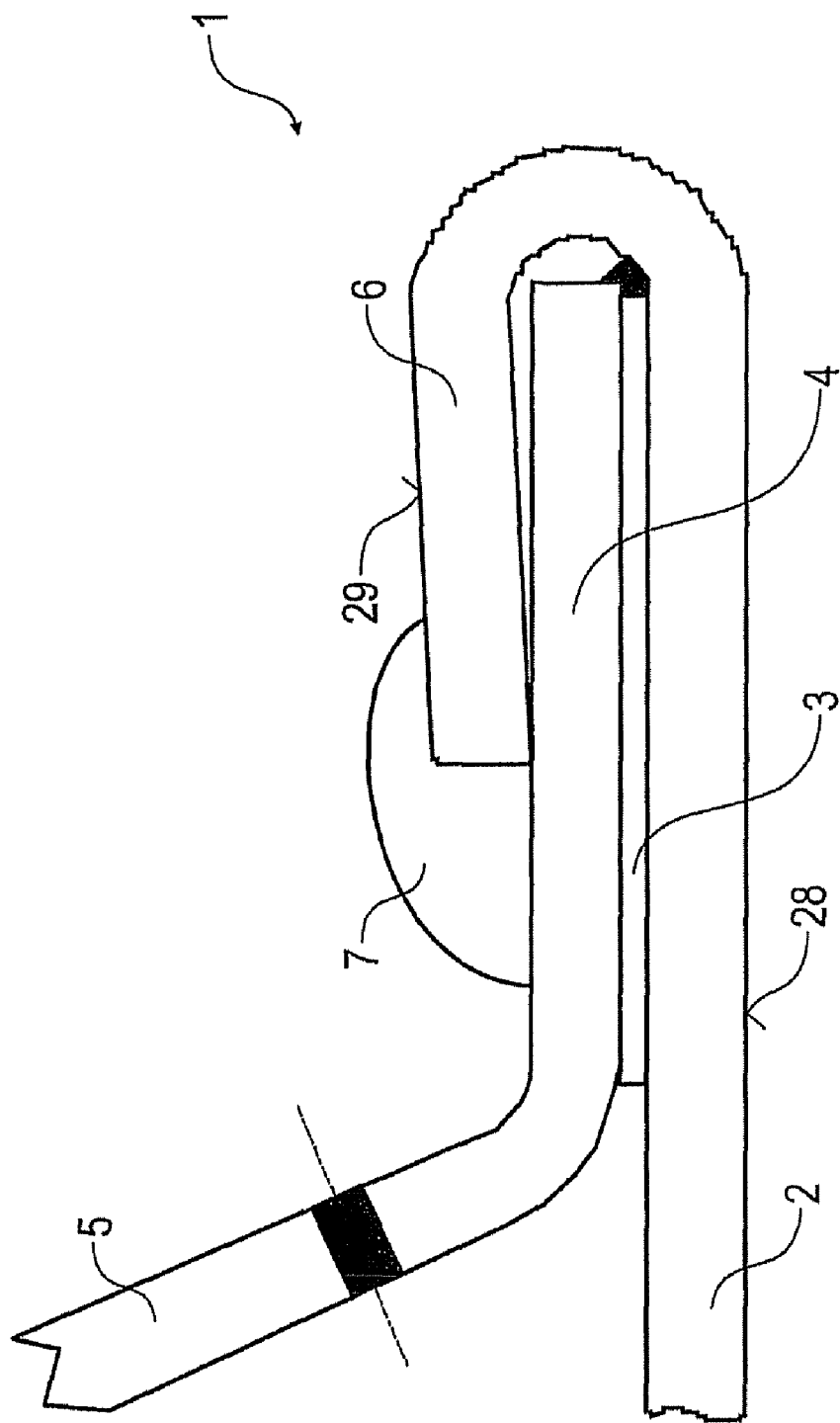
FIG. 10: is a cross-section through a flanged seam (prior art).

Turning now to FIGS. 1 to 4, an inventive applicator 8 is illustrated, which generally includes an application tool 9 and a tolerance compensator 10, and which may be used to apply the sealant 7 to the flanged seam 1, e.g., as shown in FIG. 10.

The tolerance compensator 10 has a mounting flange 11, by which the applicator 8 may be mounted on a robot flange of a robot hand axis of a six-axis robot. In operation, the applicator 8 may be generally guided by the multiple-axis robot along the flanged seam 1 to be coated, whereby the applicator 8 delivers the sealant 7, as will be described in detail.

The tolerance compensator 10 has a further mounting flange 12 on a side facing the application tool 9, which is connected to the application tool 9 by a tapered connector 13.

The tolerance compensator 10 then facilitates avoiding movements by the mounting flange 12 and thus the complete application tool 9 in relation to the mounting flange 11 on the robot side in the X-, Y- and Z-directions, where the X-direction is aligned at right angles to the plane of the drawing.

Figure 2:
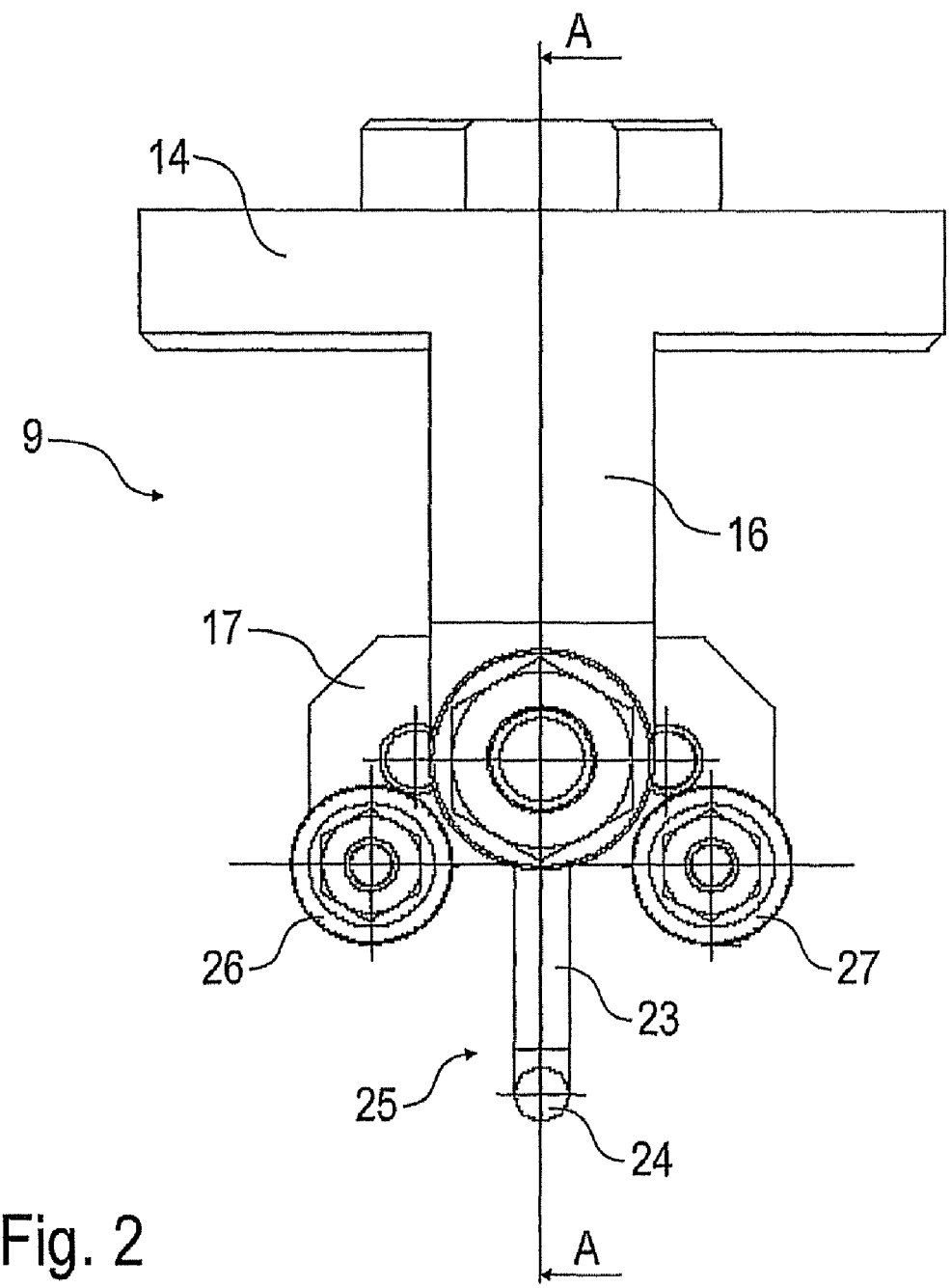
FIG. 2: is a plan view of the application tool in accordance with FIG. 1.
Figure 3:
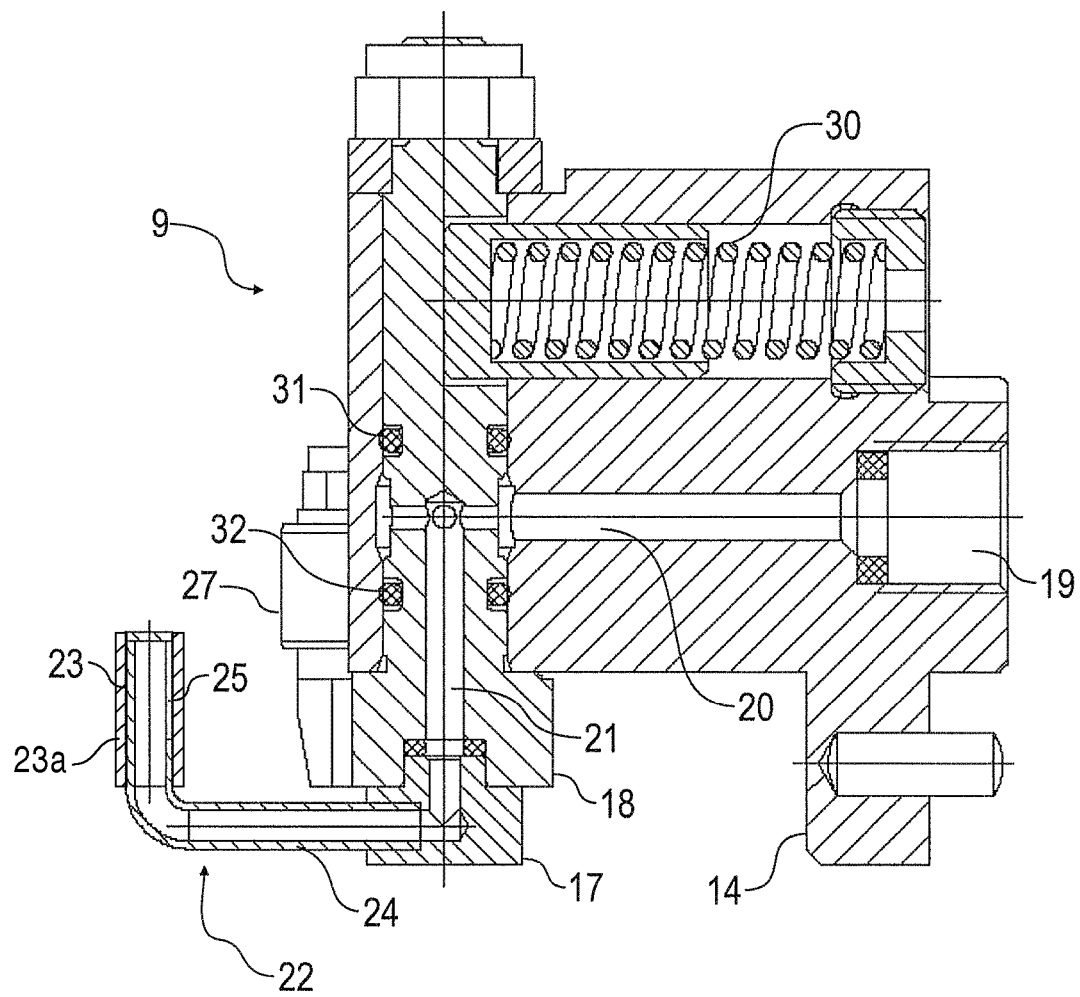
FIG. 3: is a cross-section of the application tool in accordance with FIG. 2 along the line A-A in FIG. 2.

The application tool 9 is described in detail in FIGS. 1 to 3 and is explained in detail below.

The application tool 9 has a mounting flange 14 for making a connection with the tapered connector 13, where said mounting flange 14 has several bores 15, so that the mounting flange 14 of the application tool 9 may be bolted to the tapered connector 13 of the tolerance compensator 10.

The application tool also has a web of material 16 which protrudes forward generally at a right angle to the mounting flange 14 and forms a rotatable bearing for a pressure rocker 17.

The web of material 16 has a vertical bore in which a rotor 18 is borne so that it will rotate, where the rotor 18 bears the pressure rocker 17 on its underside. The pressure rocker may thus swivel about an axis of rotation defined by the web of material 16 and/or rotor 18.

The mounting flange 14 of the application tool 9 also has a central bore 19, through which the sealant 7 to be applied is fed through the tolerance compensator 10.

The bore 19 in the mounting flange 14 ends in a continued, axially flush bore 20 in the web of material 16.

The rotor 18 also contains a bore 21, which is connected to the bore 20 in the web of material 16 by a radially-extending branch bore.

The bore 21 in the rotor 18 itself ends in a corresponding bore in the pressure rocker 17, where said bore 21 ends in an interchangeable nozzle pipe 22. The nozzle pipe has a shock absorbing coating 23a.

The nozzle pipe 22 has a proximal pipe section 23 and a distal pipe section 24, where the distal pipe section 24 is at an angle of 90° to the proximal pipe section 23 and has a nozzle 25 on an inside surface, e.g., a surface of the proximal pipe section closest to the tolerance compensator 10 and/or mounting flange 14.

In operation, a sealant 7 is generally carried along the robot hand axis through the tolerance compensator 10 and then through bores 19-21 to the nozzle pipe 22, where the sealant 7 finally leaves the nozzle pipe 22 through the nozzle 25.

Figure 4:
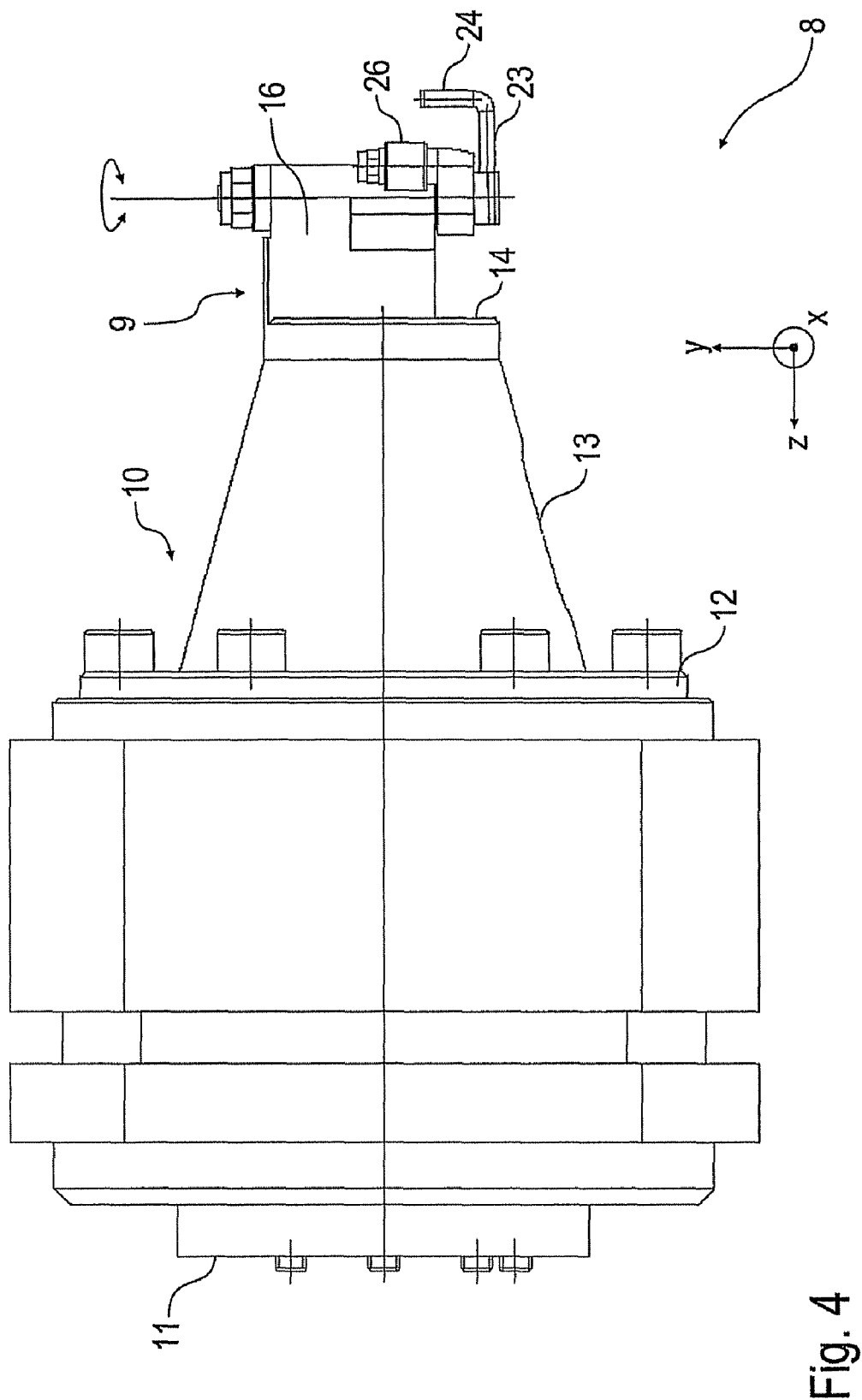
FIG. 4: is a side elevation of an exemplary applicator with the application tool in accordance with FIGS. 1 to 3 and an additional tolerance compensator.

Two contact pressure rollers 26, 27 may be provided on the pressure rocker 17 so that they will rotate or roll along a front side 28 (see FIG. 10) of the component to be sealed in operation, substantially at right angles to the plane of the drawing. This rolling contact between the two contact pressure rollers 26, 27 and the front side 28 of the sheet metal panel 2 generally holds the nozzle 25 in a predetermined or specified position on a reverse side 29 of the flanged seam 1, thereby allowing for applying the sealant 7 cleanly and precisely. As best seen in FIGS. 2 and 4, each of the contact pressure rollers 26, 27 have axes of rotation that extend substantially parallel to each other. The contact pressure rollers 26, 27 cooperate to form a common rolling surface, with at least one contact pressure roller disposed on either side of the axis of rotation of the pressure rocker 17. Moreover, as described above the pressure rocker 17 swivels about an axis of rotation defined by the web of material 16 and/or rotor 18. Thus, a rotary avoiding movement of the nozzle 25 may be provided in a rotation plane which is aligned substantially at right angles to the surface of a component to be coated, the rolling surface of the contact pressure rollers or the distal section of the nozzle pipe. For example, as shown in FIGS. 2 and 4, the pressure rocker 17 may generally be rotated about an axis of rotation defined by the bore of the rotor 18, the axis of rotation extending generally parallel to a surface of a component to be coated such that the nozzle 25 is rotated in a plane oriented substantially at a right angle to a surface of the component to be coated.

The tolerance compensator 10 generally facilitates avoiding movements by the application tool 9 in the X-direction, Y-direction and Z-direction, thereby reducing the requirements for the positional accuracy of the robot used.

The application tool 9 may also include a coil spring 30, which presses against the rotor 18 in a correspondingly-adapted recess, thereby returning the rotor 18 to a neutral position when no external forces sufficient to overcome a force provided by the coil spring 30 are acting on the contact pressure rollers 26, 27.

The application tool also has two gaskets 31, 32 above and below the radial branch bore in the rotor 18, thereby generally sealing an annulus between the rotor 18 and the corresponding bore in the web of material 16 above and below.

Figure 5:
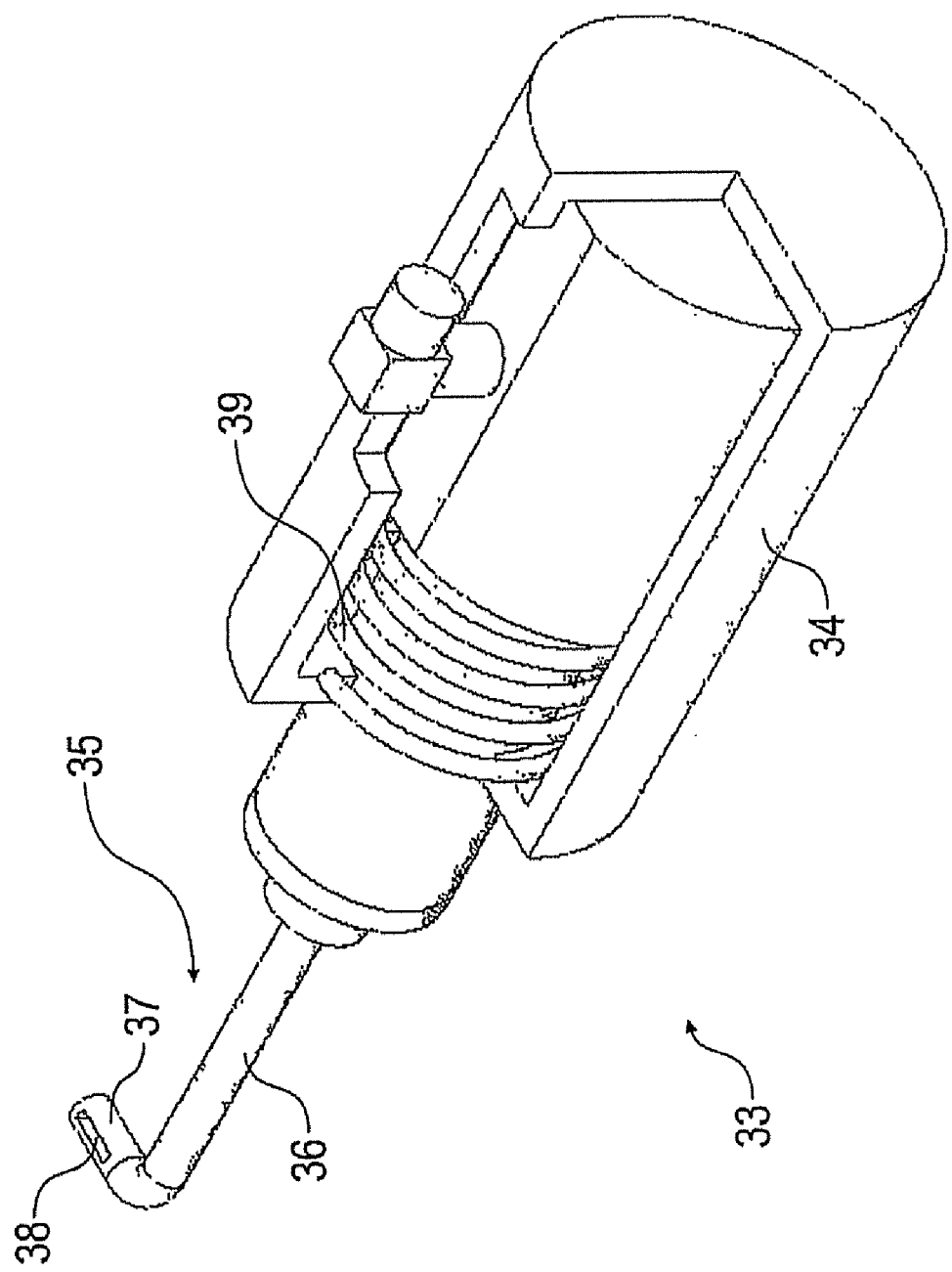
FIG. 5: is a three-quarter, partial cutaway view of another exemplary applicator.

FIG. 5 shows an alternative example of an applicator 33, which may be used to apply the sealant 7 to the flanged seam 1 (see FIG. 10).

The applicator 33 generally includes a carrier 34 and a nozzle pipe 35 configured to yield elastically, where said nozzle pipe 35 has a proximal pipe section 36 and a distal pipe section 37. The distal pipe section 37 is then substantially at an angle of 90° relative to the proximal pipe section and has a nozzle 38 through which the sealant 7 can be applied.

In operation, the distal pipe section 37 generally slides along the reverse side 29 (see FIG. 10) of the flanged seam 1, whereby the nozzle 38 applies the sealant 7.

A translational joint may be located in the carrier 34, which facilitates a translational avoiding movement of the nozzle pipe 35 in relation to the carrier 34.

A coil spring 39 is also located in the carrier 34 which returns the nozzle pipe 35 to a neutral translational position when no external forces great enough to resist a spring force supplied by the coil spring 39 are acting on said nozzle pipe 35, e.g., when there is no physical contact between the distal pipe section 37 and the reverse side 29 of the flanged seam 1.

Figure 6:
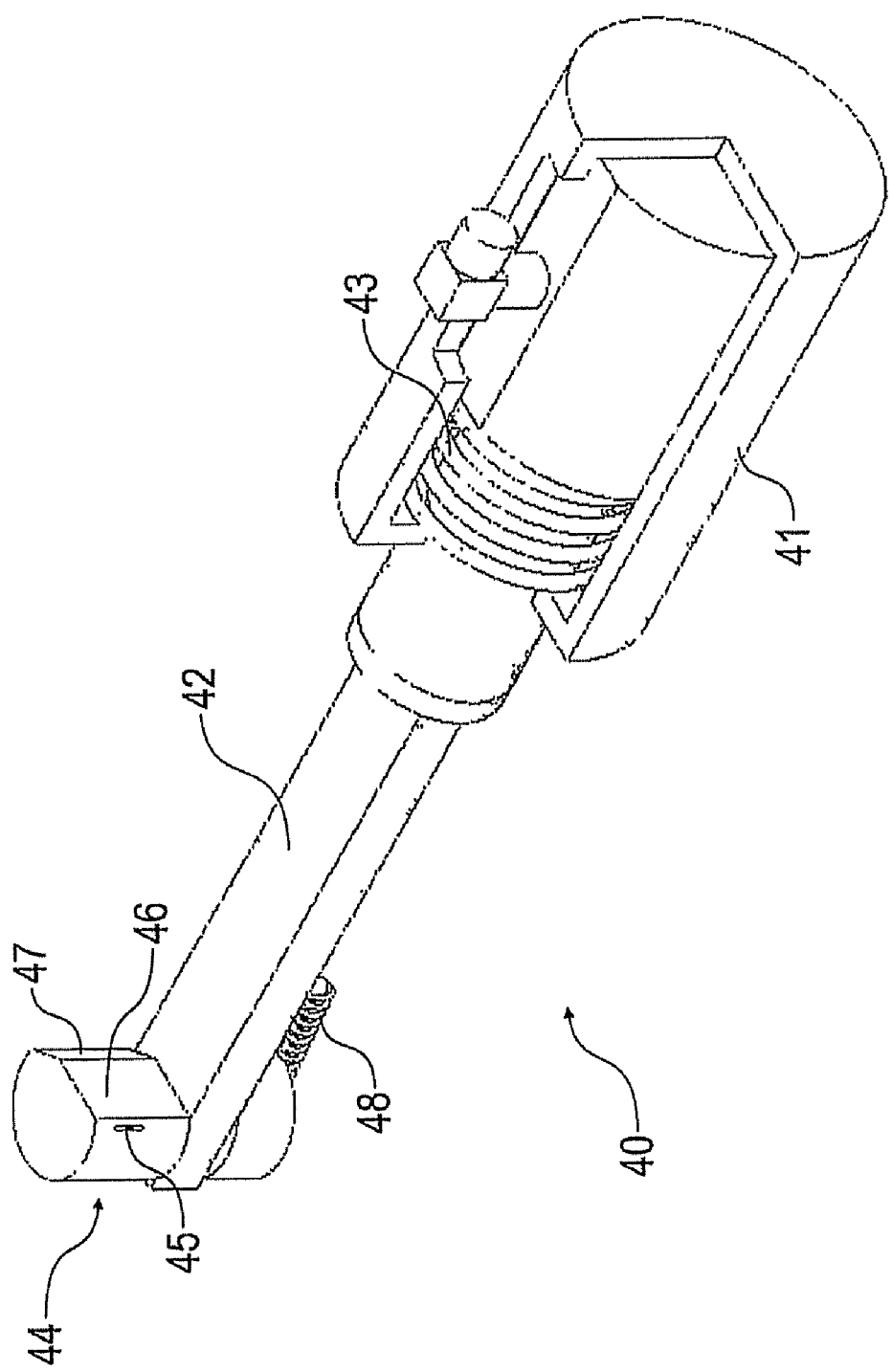
FIG. 6: is a further example of an applicator in a three-quarter, partially cutaway view.
Figure 7:
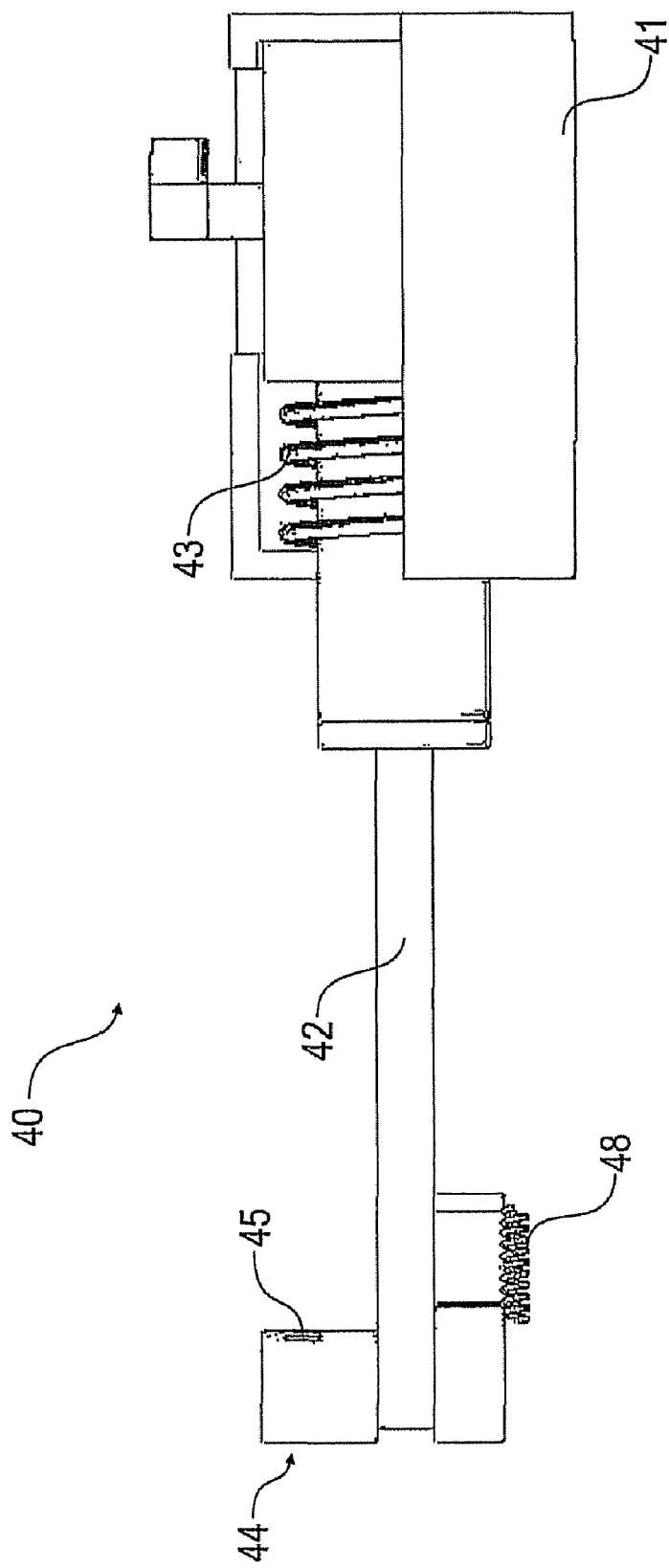
FIG. 7: is a view from below of the applicator in FIG. 6.

FIGS. 6 and 7 show an alternative example of an applicator 40, which may be used to apply the sealant 7 to the flanged seam 1 (see FIG. 10).

The applicator 40 generally includes a carrier 41 and a hollow arm 42, where the arm 42 may be moved translationally with respect to the carrier 41 by a joint in said carrier 41.

A coil spring 43 generally returns the arm 42 to a neutral position in relation to the carrier 41 when no external forces sufficient to resist a force provided by the coil spring 43 are acting on said arm 42.

At its distal end the arm 42 may include a swivelable application head 44 with a nozzle 45 and a sliding surface 46, which generally slides on the reverse side (see FIG. 10) of the flanged seam in operation.

Moreover, the application head 44 includes an angled ramp 47 before the sliding surface 46 in the direction of sliding, at an angle of 30° to the sliding surface. The angled ramp 47 generally ensures that the application head 44 adapts to the contours on the reverse side 29 of the flanged seam 1. As described above, while the angled ramp 47 described herein is at an angle of 30 degrees with respect to the sliding surface 46, other angles may be used as convenient.

The applicator 40 also includes a coil spring 48, which returns the application head 44 to a specified neutral position in the absence of external forces resisting the coil spring 48.

The exemplary illustration shown in FIG. 8 largely matches the example described above and shown in FIGS. 6 and 7, so reference is made to the above description to avoid repetition, whereby the same reference numbers are used for corresponding details below, distinguished only by an apostrophe.

Figure 8:
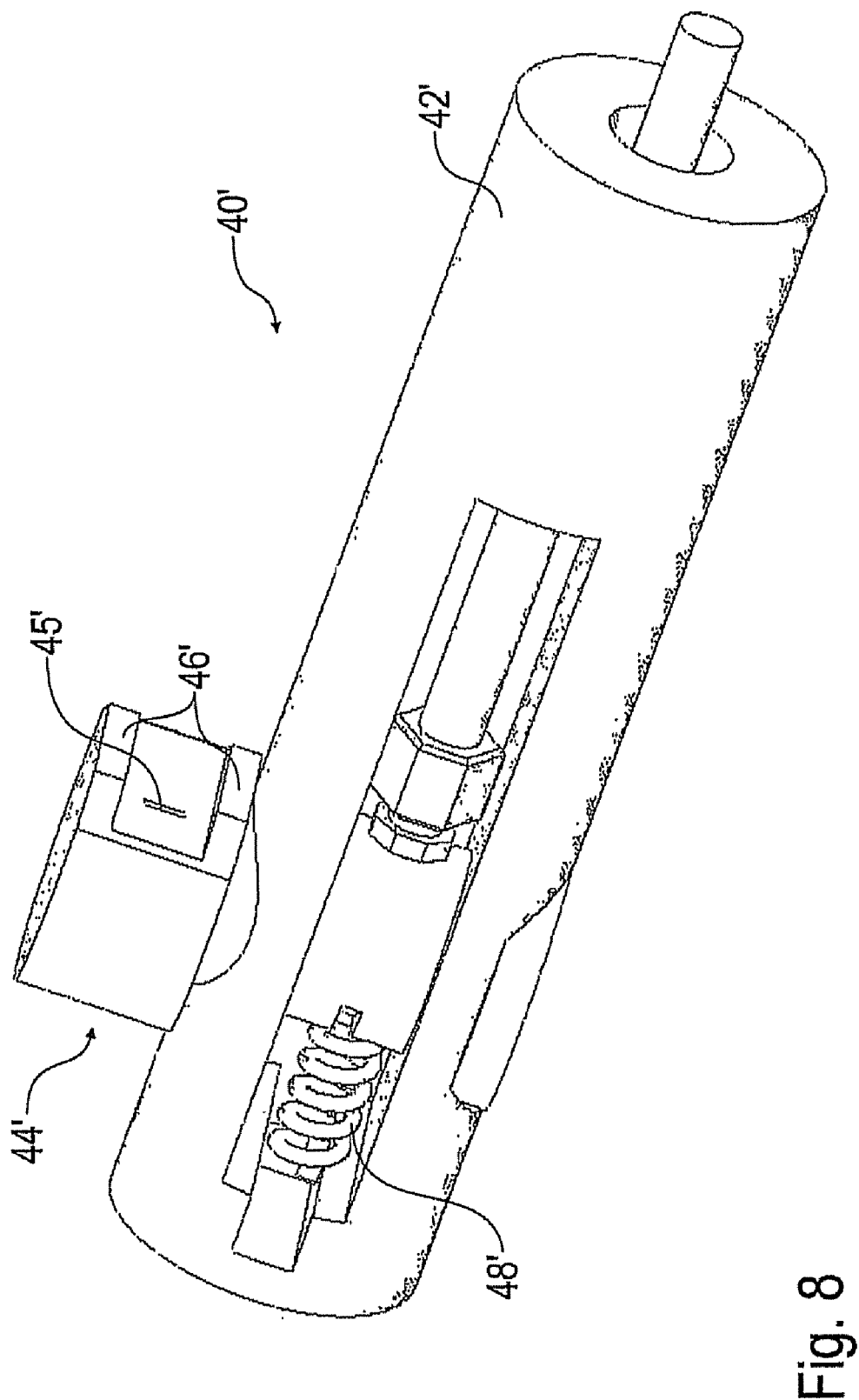
FIG. 8: is a further example of an applicator as shown in FIGS. 6 and 7, modified with an internal spring.

In the example shown in FIG. 8, the spring 48' for returning the application head 44' is located inside the hollow arm 42'.

As shown in FIG. 8, the hollow arm 42' has a substantially circular cross-section.

Figure 9:
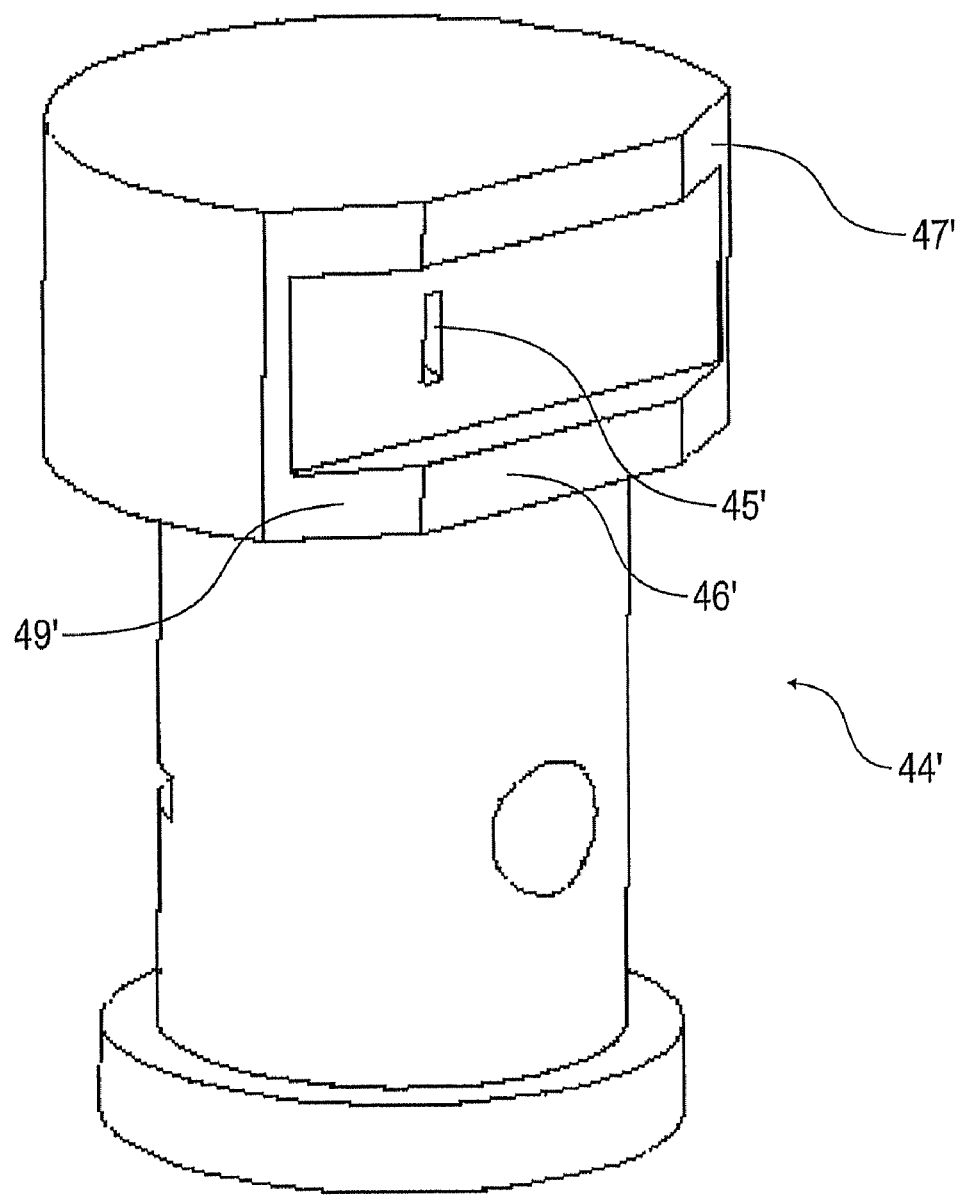
FIG. 9: is a three-quarter partial view of a swivelable nozzle head for the exemplary illustration in accordance with FIG. 8.

Turning now to FIG. 9, a three-quarter detail view of the application head 44' from FIG. 8 is shown, where it may additionally be discerned that a ramp 49' is also located behind the sliding surface 46 with respect to a direction of sliding.

Accordingly, the compensator 10 and tool 9 generally provide for avoidance movements of the tool 9 in response to an external stimulus. Moreover, these avoidance movements may occur between a nozzle in relation to a carrier associated with the nozzle. For example, an avoidance movement may be a passive movement of the tool 9 in reaction to contact, intended or otherwise, between a component being coated and any part of the tool 9, e.g., nozzle 25. Further, the avoidance movements may occur translationally, e.g., as described above in conjunction with the various sliding arms permitting translational movement, and/or rotationally, e.g., as described above in conjunction with the rotational movements of the pressure rocker 17. Finally, where the avoidance movements are permitted in greater magnitudes than a positional tolerance of a robot to which the tool 9 is mounted, the avoidance movement will generally be sufficient to overcome any positional errors of the robot. The tool 9 may thus passively respond to positional errors of a robot as the tool 9 is guided along a component as the tool 9 applies a coating, e.g., a sealant, to the component.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain approaches, examples or embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. An applicator for applying a coating agent to a component, the applicator comprising:
   a hollow arm;
   a nozzle head attached to the hollow arm, the nozzle head configured to swivel, the nozzle head containing a nozzle configured to supply the coating agent on to the component, and
   a carrier guided by a multiple-axis robot in operation, and
   an elastic joint which is located kinematically between the carrier and the nozzle, said elastic joint permitting an avoiding movement of the nozzle in relation to the carrier, and
   a spring element configured to reset a position of the nozzle head to a predetermined position, the spring element being located in the hollow arm.

2. The applicator according to claim 1, wherein the coating agent is a sealant.

3. The applicator according to claim 2, wherein the component is a motor vehicle body component flanged seam, and the nozzle is configured to deliver the sealant to the flanged seam.

4. The applicator in accordance with claim 1, further comprising a spring element which returns the elastic joint and thus the nozzle to a specified neutral position in relation to the carrier.

5. The applicator according to claim 1, further comprising at least one rotatable contact pressure roller configured to roll on the component to be coated in operation.

6. The applicator according to claim 1, further comprising at least one sliding surface which slides on the component to be coated.

7. The applicator in accordance with claim 5, wherein the contact pressure roller at least partially includes a plastic material.

8. The applicator in accordance with claim 7, wherein the contact pressure roller and the joint have axes of rotation which extend substantially parallel to each other.

9. The applicator in accordance with claim 8, wherein the contact pressure roller and the nozzle are rigidly connected with each other and may be swivelled in relation to the carrier by the joint.

10. The applicator in accordance with claim 1, wherein the joint is selected from a group consisting of:
    a swivel joint and
    a drag link.

11. The applicator in accordance with claim 1, wherein a pressure rocker is attached by the joint to the carrier so that it will swivel about a specified axis of rotation and bears the nozzle and at least one contact pressure roller on both sides of the axis of rotation, where the contact pressure rollers form a common rolling surface.

12. The applicator in accordance with claim 6, wherein the sliding surface has an angled ramp positioned in front of the nozzle in the direction of sliding, the sliding surface configured to compensate for surface contours of the component to be coated.

13. The applicator in accordance with claim 11, wherein the pressure rocker, the contact pressure roller and the joint hold the nozzle in operation at a specific physical alignment in relation to the surface of the component to be coated.

14. The applicator in accordance with claim 1, further comprising a nozzle pipe having a proximal pipe section and a distal pipe section, where the distal pipe section is at an angle to the proximal pipe section, thereby being configured to grip the component to be coated from behind, the nozzle being located in the distal pipe section and directed inwards, thereby being configured to coat the component from behind.

15. The applicator in accordance with claim 1, wherein the nozzle has a discharge direction at a specific angle in relation to the surface of the component to be coated, wherein the angle is between approximately 10 degrees and 90 degrees.

16. The applicator according to claim 15, wherein the nozzle is a round spray nozzle.

17. The applicator according to claim 15, wherein the nozzle is an extrusion nozzle.

18. The applicator according to claim 15, wherein a plurality of interchangeable nozzles with different nozzle shapes and dimensions are provided.

19. The applicator in accordance with claim 14, wherein the nozzle pipe is interchangeable.

20. The applicator in accordance with claim 14, wherein the nozzle pipe has a shape which is selected from a group consisting of:
    L-shape and
    U-shape.

21. The applicator in accordance with claim 14, wherein the nozzle pipe has a shock-absorbing coating.

22. The applicator in accordance with claim 1, wherein a coating agent hose extends in the hollow arm to the nozzle head.

23. The applicator in accordance with claim 1, wherein a coating agent feed system extends inside the carrier.

24. The applicator in accordance with claim 1, wherein the joint permits at least one rotary avoiding movement of the nozzle in relation to the carrier.

25. The applicator in accordance with claim 1, wherein the joint permits at least one translational avoiding movement of the nozzle in relation to the carrier.

26. The applicator in accordance with claim 25, wherein the at least one translational avoiding movement includes:
    a first translational avoiding movement of the nozzle that is aligned substantially at right angles to the surface of the component to be coated; and
    a second translational avoiding movement of the nozzle that is aligned substantially parallel to the surface of the component to be coated.

27. The applicator according to claim 24, wherein the rotary avoiding movement of the nozzle occurs in a rotation plane which is aligned substantially at right angles to the surface of the component to be coated.

28. A coating robot comprising an applicator according to claim 1.

* * * * *